(12) United States Patent
Park et al.

(10) Patent No.: US 11,581,532 B2
(45) Date of Patent: Feb. 14, 2023

(54) ELECTRODE HAVING NO CURRENT COLLECTOR AND SECONDARY BATTERY INCLUDING THE SAME

(71) Applicant: LG Chem, Ltd., Seoul (KR)

(72) Inventors: Se Mi Park, Daejeon (KR); Eun Kyung Kim, Daejeon (KR); Yong Ju Lee, Daejeon (KR); Sun Young Shin, Daejeon (KR); Dong Hyuk Kim, Daejeon (KR)

(73) Assignee: LG Energy Solution, Ltd.

( * ) Notice: Subject to any disclaimer, the term of this patent is extended or adjusted under 35 U.S.C. 154(b) by 300 days.

(21) Appl. No.: 16/745,904

(22) Filed: Jan. 17, 2020

(65) Prior Publication Data
US 2020/0227740 A1    Jul. 16, 2020

Related U.S. Application Data

(63) Continuation of application No. PCT/KR2018/007497, filed on Jul. 3, 2018.

(30) Foreign Application Priority Data

Jul. 19, 2017   (KR) .................. 10-2017-0091275

(51) Int. Cl.
*H01M 4/00*   (2006.01)
*H01M 4/505*   (2010.01)
(Continued)

(52) U.S. Cl.
CPC ........... *H01M 4/505* (2013.01); *H01M 4/133* (2013.01); *H01M 4/134* (2013.01); *H01M 4/525* (2013.01);
(Continued)

(58) Field of Classification Search
CPC .. H01M 50/46; H01M 4/626; H01M 10/0585; H01M 10/0587; H01M 4/131; Y02E 60/10
See application file for complete search history.

(56) References Cited

U.S. PATENT DOCUMENTS 9,252,413 B2    2/2016    Hong et al.
9,876,223 B2    1/2018    Ryu et al.
(Continued)

FOREIGN PATENT DOCUMENTS

CN    1444301 A        9/2003
CN    103762349 A  *  4/2014    ............. B82Y 30/00
(Continued)

OTHER PUBLICATIONS

International Search Report for Application No. PCT/KR2018/007497 dated Oct. 2, 2018, 3 pages.
(Continued)

*Primary Examiner* — Cynthia H Kelly
*Assistant Examiner* — Monique M Wills
(74) *Attorney, Agent, or Firm* — Lerner, David, Littenberg, Krumholz & Mentlik, LLP (57) ABSTRACT

An electrode for batteries that does not include a metal-film-type current collector is disclosed herein. In some embodiments, the electrode comprises a composite having a core-shell structure including a core having an electrode active material, and a metal material coated on or doped in the surface of the core. A secondary battery having the electrode has increased capacity and energy density and exhibits improved lifespan characteristics.

16 Claims, 7 Drawing Sheets

(51) Int. Cl.
  H01M 4/133  (2010.01)
  H01M 4/134  (2010.01)
  H01M 4/525  (2010.01)
  H01M 50/46  (2021.01)
  H01M 4/02   (2006.01)

(52) U.S. Cl.
  CPC ...... *H01M 50/46* (2021.01); *H01M 2004/027* (2013.01); *H01M 2004/028* (2013.01)

(56) References Cited

U.S. PATENT DOCUMENTS

| | | | |
|---|---|---|---|
| 2003/0138698 A1 | 7/2003 | Lee et al. | |
| 2003/0157407 A1 | 8/2003 | Kosuzu et al. | |
| 2006/0237697 A1 | 10/2006 | Kosuzu et al. | |
| 2008/0090152 A1 | 4/2008 | Kosuzu et al. | |
| 2010/0323098 A1 | 12/2010 | Kosuzu et al. | |
| 2014/0017576 A1* | 1/2014 | Kim | H01M 10/0566 429/403 |
| 2014/0087233 A1 | 3/2014 | Hong et al. | |
| 2014/0295273 A1 | 10/2014 | Mah et al. | |
| 2014/0377617 A1* | 12/2014 | Kwon | H01M 50/463 429/94 |
| 2014/0377618 A1 | 12/2014 | Kwon et al. | |
| 2015/0004453 A1 | 1/2015 | Kwon et al. | |
| 2015/0093640 A1 | 4/2015 | Majima et al. | |
| 2015/0099187 A1 | 4/2015 | Cui et al. | |
| 2015/0243970 A1 | 8/2015 | Choi et al. | |
| 2015/0349308 A1* | 12/2015 | Hwang | H01M 10/4235 429/144 |
| 2015/0372291 A1 | 12/2015 | Ryu et al. | |
| 2016/0020487 A1 | 1/2016 | Yamada et al. | |
| 2016/0204423 A1 | 7/2016 | Jeong et al. | |
| 2017/0033396 A1 | 2/2017 | Kwon et al. | |
| 2020/0176752 A1* | 6/2020 | Birt | H01M 10/0565 |

FOREIGN PATENT DOCUMENTS

| | | |
|---|---|---|
| CN | 104246941 A | 12/2014 |
| CN | 102651476 B | 1/2015 |
| CN | 104393324 A | 3/2015 |
| CN | 105304848 A | 2/2016 |
| JP | 2008258031 A | 10/2008 |
| JP | 2011210490 A | 10/2011 |
| JP | 2014518432 A | 7/2014 |
| KR | 20090012182 A | 2/2009 |
| KR | 20110100114 A | 9/2011 |
| KR | 20140117205 A | 10/2014 |
| KR | 20150027003 A | 3/2015 |
| KR | 20150033854 A | 4/2015 |
| KR | 20150090963 A | 8/2015 |
| KR | 20150101873 A | 9/2015 |
| KR | 20160000235 A | 1/2016 |
| KR | 101650024 B1 | 8/2016 |

OTHER PUBLICATIONS

Extended European Search Report including Written Opinion for Application No. EP18834370.1 dated Jun. 30, 2020, 7 pgs.

Search Report dated Feb. 24, 2022 from the Office Action for Chinese Application No. 201880023678.8 issued Mar. 3, 2022, 3 pages. [See p. 1-2, categorizing the cited references].

* cited by examiner

ELECTRODE HAVING NO CURRENT COLLECTOR AND SECONDARY BATTERY INCLUDING THE SAME

The present application is a bypass continuation of International Application No. PCT/KR2018/007497, filed on Jul. 3, 2018, which claims priority from Korean Patent Application No. 2017-0091275, filed on Jul. 19, 2017, the disclosures of which are incorporated by reference herein.

TECHNICAL FIELD

The present invention relates to an electrode having no current collector and a secondary battery including the same, and more particularly to an electrode having a core-shell structure including a core having an electrode active material, and a metal material coated on or doped in the surface of the core, and a secondary battery including the same.

BACKGROUND ART

In general, there are various kinds of secondary batteries, such as a nickel cadmium battery, a nickel hydride battery, a lithium ion battery, and a lithium ion polymer battery. Such secondary batteries have been used in large-sized products that require high output, such as an electric vehicle and a hybrid electric vehicle, a power storage apparatus for storing surplus power or new and renewable energy, and a backup power storage apparatus, as well as small-sized products, such as a digital camera, a portable digital versatile disc (P-DVD) player, a cellular phone, a wearable device, a portable game device, a power tool, and an electric bicycle (E-bike).

A lithium secondary battery generally includes a positive electrode (a cathode), a separator, and a negative electrode (an anode). The materials of the positive electrode, the separator, and the negative electrode are selected in consideration of the lifespan, the charge and discharge capacity, the temperature characteristics, and the safety of the battery.

With increased demand for a secondary battery having large capacity and high efficiency, various attempts have been made to increase the capacity and energy density of the battery. In the case in which the inner space of a battery cell is reduced, however, gas is not rapidly discharged from the battery cell, whereby the battery cell may easily explode. In the case in which the amount of electrode mixture that is loaded is increased, the length of the path along which lithium ions move is increased, whereby the lifespan of the battery cell is reduced.

Specifically, Japanese Patent Application Publication No. 2011-210490 discloses an electrode active material including core particles, each of which includes a lithium phosphate composite transition metal oxide, and a conductive carbon material coated on the surface of each of the core particles, Chinese Patent Application Publication No. 102651476 discloses a positive electrode configured such that positive electrode slurry including a silicon-carbon composite positive electrode active material, configured to have a structure in which silicon is coated on the surface of carbon, is applied to copper foil, Korean Patent Application Publication No. 2015-0101873 discloses a positive electrode active material having a coating layer, including a sulfur (S) component formed on a core. In the inventions disclosed in the above publications, however, a general electrode, which is configured to have a structure in which an electrode active material is applied to an electrode current collector, is used. Meanwhile, Japanese Patent Application Publication No. 2008-258031 discloses an electrode having no electrode current collector. However, it is not possible to suggest a technical solution for using a conventional lithium transition metal oxide, since only a conductive polymer material is used as an electrode active material.

Korean Patent Application Publication No. 2011-0100114 discloses micro-scale active material particles constituting an electrode having no electrode current collector, wherein the micro-scale active material particles are present in the form of particles or wedges and wherein the micro-scale active material particles include both at least one kind of active material and at least one kind of non-active material. Since the micro-scale active material particles are configured to have a structure in which electrode particles, serving as a current collector, are difficult to be electrically connected to each other, however, the performance of a battery is low, and the structure of the battery is complicated, since a separate porous material is prepared as a core.

Therefore, there is a strong necessity for technology that is capable of enabling a conventional general positive electrode active material to be used, enabling gas to be discharged promptly from a battery cell when the battery cell swells, thereby preventing a reduction in the lifespan of the battery cell, and enabling the capacity and the energy density of a battery to be increased.

DISCLOSURE

Technical Problem

The present invention has been made in view of the above problems, and it is an object of the present invention to provide technology that is capable of enabling a conventional general positive electrode active material to be used, enabling gas to be discharged promptly from a battery cell when the battery cell swells, thereby preventing a reduction in the lifespan of the battery cell, and enabling the capacity and the energy density of a battery to be increased.

Technical Solution

In accordance with an aspect of the present invention, the above and other objects can be accomplished by the provision of an electrode for batteries that does not include a metal-film-type current collector, wherein the electrode comprises a composite having a core-shell structure, including a core having an electrode active material, and a metal material coated on or doped in the surface of the core. The metal material can be included in a metal layer coated on the surface of the core or doped in the surface of the core.

According to the present invention, it is possible to increase the volume of the electrode in proportion to the volume of a current collector, which is not included in the electrode, whereby it is possible to provide a secondary battery having considerably increased capacity and energy density.

Consequently, it is possible to solve problems, such as an increased risk of explosion of a battery cell due to inefficient discharge of gas from the battery cell caused by reducing the inner space of the battery cell and deterioration of the lifespan characteristics of the battery cell due to an increase in the length of the path along which lithium ions move, caused by increasing the amount of an electrode mixture that is loaded, and at the same time it is possible to provide a secondary battery having large capacity and high efficiency.

Since the electrode according to the present invention comprises a composite having a core-shell structure including a core having an electrode active material, and a metal material coated on or doped in the surface of the core, conventional electrode active materials may be used in a core, whereby it is not necessary to develop new electrode active materials. In addition, since an electrode having the composite having a core-shell structure with the metal material coating the surface of the core in the form of a metal layer or doped in the surface of the core is used, it is possible to provide an electrode that exhibits high electrical conductivity, even though an electrode current collector is omitted.

In a concrete example, the electrode may be selectively applied in consideration of conditions, such as capacity, volume, and cost, of a device in which a battery is used. Specifically, the electrode may be applied to a positive electrode or a negative electrode. Alternatively, the electrode may be applied to both a positive electrode and a negative electrode.

The electrode according to the present invention comprises a composite having a core-shell structure. The kind and content of an electrode active material located in the core of the electrode are factors that determine the performance of a battery.

That is, the capacity of the battery may vary depending on the ratio of the content of the electrode active material located in the core to the content of the metal material in the metal layer.

Specifically, on the assumption that the thickness of the metal layer is uniform, in the case in which the size of the electrode is too large, the relative volume of the core increases, whereas the relative volume of the metal layer decreases. For this reason, it is desirable for the electrode to have a predetermined size. In the case in which the size of the electrode is too large, however, the density of an electrode mixture layer is decreased, with the result that the effect of increasing the capacity of the battery may be reduced, which is undesirable.

In consideration of the above effect, for example, the particle diameter D50 of a composite for the positive electrode having the core-shell structure may range from 3 μm to 30 μm. In the case in which a graphite-based active material is used as the negative active material, the particle diameter D50 of the composite for the negative electrode having the core-shell structure may range from 3 μm to 30 μm. Meanwhile, in the case in which a large-capacity silicon-based active material is used as the negative active material, a negative active material having a relatively small size may be used in order to increase the density of a negative electrode mixture. For example, the particle diameter D50 of the composite for the negative electrode having the core-shell structure may range from 2 μm to 20 μm.

Meanwhile, the thickness of the metal layer, which is coated or doped on the surface of the core, may range from 0.01 nm to 100 nm in consideration of the kind and size of the electrode active material located in the core.

The electrode according to the present invention is advantageous in that electrode active materials applied to a conventional electrode for secondary batteries may be used. For example, the positive electrode according to the present invention may include at least one positive electrode active material represented by chemical formulas 1 to 3 below.

$$Li_aCo_{1-x}M_xO_2 \quad (1)$$

$$Li_aMn_{2-y}M_yO_4 \quad (2)$$

$$Li_aFe_{1-z}M_zPO_4 \quad (3)$$

In the above chemical formulas, $0.8 \leq a \leq 1.2$; $0 \leq x \leq 0.8$; $0 \leq y \leq 0.6$; $0 \leq z \leq 0.5$, and M is at least one selected from the group consisting of Ti, Cd, Cu, Cr, Mo, Mg, Al, Ni, Nb, V, and Zr.

That is, the positive electrode active material may include at least one selected from the group consisting of a lithium metal oxide having a layered structure, represented by chemical formula 1, a lithium-manganese-based oxide having a spinel structure, represented by chemical formula 2, and lithium-containing phosphate having an olivine structure, represented by chemical formula 3.

The lithium metal oxide having the layered structure is not particularly restricted in terms of the kind thereof. For example, the lithium metal oxide having the layered structure may be at least one selected from the group consisting of a lithium cobalt oxide, a lithium nickel oxide, a lithium manganese oxide, a lithium cobalt-nickel oxide, a lithium cobalt-manganese oxide, a lithium manganese-nickel oxide, a lithium cobalt-nickel-manganese oxide, and a material obtained by replacing at least one of the above-specified elements with another element(s) different from the above-specified elements or doping another element(s) different from the above-specified elements.

The lithium-manganese-based oxide having the spinel structure is also not particularly restricted in terms of the kind thereof. For example, the lithium-manganese-based oxide having the spinel structure may be at least one selected from the group consisting of a lithium manganese oxide, a lithium nickel-manganese oxide, and a material obtained by replacing at least one of the above-specified elements with another element(s) different from the above-specified elements or doping another element(s) different from the above-specified elements.

In addition, the lithium-containing phosphate having the olivine structure is not particularly restricted in terms of the kind thereof. For example, the lithium-containing phosphate having the olivine structure may be lithium iron phosphate or a material obtained by replacing the above-specified element with another element(s) different from the above-specified element.

Here, the another element(s) may be at least one selected from the group consisting of Al, Mg, Mn, Ni, Co, Cr, V, and Fe.

In addition, the negative electrode is not particularly restricted in terms of the kind thereof. For example, the negative electrode may include a carbon-based negative electrode active material or a silicon-based negative electrode active material.

In a concrete example, the metal material, coated on or doped in the surface of the core including the electrode active material, improves the electrical conductivity of the electrode. The metal material used for the positive electrode, in which an oxidation reaction occurs, may be different from the metal material used for the negative electrode, in which a reduction reaction occurs. For example, aluminum (Al), which exhibits excellent oxidation safety, may be used for the positive electrode, and copper (Cu) and nickel (Ni), which exhibit excellent reduction safety, may be used for the negative electrode.

In the electrode, 20% to 90% of the surface of the core may be coated or doped with the metal material. In the case in which less than 20% of the surface of the core is coated or doped with the metal material, it is difficult to achieve the purpose of improving electrical conductivity, which is undesirable. In the case in which greater than 90% of the surface of the core is coated or doped with the metal material, the path along which lithium ions move may be affected, whereby it is difficult for the lithium ions to move smoothly, which is also undesirable.

In another concrete example, the electrode may further include a conductive agent, in addition to the composite having the core-shell structure, in order to improve electrical conductivity. The conductive agent may be at least one selected from the group consisting of natural graphite, artificial graphite, carbon black, acetylene black, Ketjen black, channel black, and conductive fiber, such as carbon fiber or metallic fiber.

The conductive agent may be added so that the conductive agent accounts for 1% to 10% based on the total weight of the electrode mixture. In the case in which the content of the conductive agent is less than 1%, it is difficult to achieve the purpose of improving electrical conductivity, which is undesirable. In the case in which the content of the conductive agent is greater than 10%, the content of the electrode having the composite having the core-shell structure is relatively reduced, whereby the capacity of the battery is reduced, which is also undesirable.

In accordance with another aspect of the present invention, there is provided a secondary battery having a separator coated with the electrode.

Specifically, an electrode mixture including an electrode active material, which is included in the composite having the core-shell structure, or an electrode mixture further including a conductive agent may be coated on a separator in order to manufacture an electrode assembly. Consequently, it is possible to provide a secondary battery having improved energy density without the provision of a separate structure, such as an electrode current collector.

As an example of the electrode assembly, a positive electrode mixture may be coated on one surface of a separator, and a negative electrode mixture may be coated on the other surface of the separator in order to constitute a mono-cell. As another example of the electrode assembly, a positive electrode mixture may be coated on one surface of a separator in order to manufacture a positive electrode, a negative electrode mixture may be coated on one surface of another separator in order to manufacture a negative electrode, and then the positive electrode and the negative electrode may be stacked such that the surface of the separator on which the positive electrode mixture is coated faces upwards and such that the surface of the separator on which the negative electrode mixture is coated faces upwards in order to manufacture an electrode assembly.

Alternatively, it is possible to manufacture an electrode assembly configured to have one or more structures in each of which a positive electrode, having positive electrode mixtures coated on opposite surfaces of a separator, and a negative electrode, having negative electrode mixtures coated on opposite surfaces of another separator, are stacked in the state in which a separate separator is interposed between the positive electrode and the negative electrode, the structures being stacked.

In accordance with another aspect of the present invention, there are provided a secondary battery including the electrode assembly and a battery pack including the secondary battery.

Specifically, the battery pack may be used as a power source for a device requiring the ability to withstand high temperatures, a long cycle, high rate characteristics, etc. Specific examples of the device may include a mobile electronic device, a wearable electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and a power storage system. However, the present invention is not limited thereto.

The structure and manufacturing method of the device are well known in the art to which the present invention pertains, and a detailed description thereof will be omitted.

The positive electrode used in the present invention is not limited to the construction described above. The positive electrode may be manufactured, for example, by applying a positive electrode mixture of a positive electrode active material including positive electrode active material particles, a conductive agent, and a binder to a positive electrode current collector. A filler may be further added to the positive electrode mixture as needed.

In general, the positive electrode current collector is manufactured so as to have a thickness of 3 to 500 μm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, or titanium. Alternatively, the positive electrode current collector may be made of aluminum or stainless steel, the surface of which is treated with carbon, nickel, titanium, or silver. Specifically, the positive electrode current collector may be made of aluminum. The positive electrode current collector may have a micro-scale uneven pattern formed on the surface thereof so as to increase the force of adhesion of the positive electrode active material. The positive electrode current collector may be configured in various forms, such as those of a film, a sheet, a foil, a net, a porous body, a foam body, and a non-woven fabric body.

The positive electrode active material may be, but is not limited to, a layered compound, such as a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiV_3O_4$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and $0.01 \leq x \leq 0.1$) or the chemical formula $Li_2Mn_3MO_8$ (where M=Fe, Co, Ni, Cu, or Zn); a disulfide compound; or $Fe_2(MoO_4)_3$, in addition to the positive electrode active material particles.

The conductive agent is generally added so that the conductive agent accounts for 0.1 to 30 weight % based on the total weight of the compound including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive materials, such as polyphenylene derivatives, may be used as the conductive agent.

The binder, which is included in the positive electrode, is a component assisting in binding between the active material and the conductive agent and in binding with the current collector. The binder is generally added in an amount of 0.1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

In accordance with a further aspect of the present invention, there is provided a lithium secondary battery including the positive electrode, a negative electrode, and an electrolytic solution. The kind of lithium secondary battery is not particularly restricted. In a concrete example, the lithium secondary battery may be a lithium ion battery or a lithium ion polymer battery, which exhibits high energy density, discharge voltage, and output stability.

In general, a lithium secondary battery includes a positive electrode, a negative electrode, a separator, and a non-aqueous electrolytic solution containing lithium salt.

Hereinafter, other components of the lithium secondary battery will be described.

The negative electrode used in the present invention is not limited to the construction described above. The negative electrode may be manufactured, for example, by applying a negative electrode mixture of a negative electrode active material including negative electrode active material particles, a conductive agent, and a binder to a negative electrode current collector. A filler may be further added to the negative electrode mixture as needed.

The negative electrode may be manufactured by applying a negative electrode active material to a negative electrode current collector and drying the same. The above-described components may be selectively further included as needed.

In general, the negative electrode current collector is manufactured so as to have a thickness of 3 to 500 µm. The negative electrode current collector is not particularly restricted, so long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of the negative electrode active material, in the same manner as the positive electrode current collector. The negative electrode current collector may be configured in various forms, such as those of a film, a sheet, a foil, a net, a porous body, a foam body, and a non-woven fabric body.

As the negative electrode active material, for example, there may be used carbon, such as a hard carbon or a graphite-based carbon; a metal composite oxide, such as $Li_xFe_2O_3 (0 \leq x \leq 1)$, $Li_xWO_2 (0 \leq x \leq 1)$, $Sn_xMe_{1-x}Me'_yO_z$ (Me: Mn, Fe, Pb, Ge; Me': Al, B, P, Si, Group 1, 2 and 3 elements of the periodic table, halogen; $0<x\leq1$; $1\leq y\leq3$; $1\leq z\leq8$); lithium metal; lithium alloy; silicon-based alloy; tin-based alloy; a metal oxide, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, or $Bi_2O_5$; a conductive polymer, such as polyacetylene; or a Li—Co—Ni based material.

The separator is interposed between the positive electrode and the negative electrode. As the separator, for example, an insulative thin film that exhibits high ion permeability and mechanical strength is used. The separator generally has a pore diameter of 0.01 to 10 µm and a thickness of 5 to 300 µm. As the material for the separator, for example, a sheet or non-woven fabric made of olefin polymer, such as polypropylene, which exhibits chemical resistance and hydrophobicity, glass fiber, or polyethylene is used. In the case in which a solid electrolyte, such as a polymer, is used as an electrolyte, the solid electrolyte may also function as the separator.

The non-aqueous electrolytic solution containing lithium salt is composed of a non-aqueous electrolytic solution and lithium salt. A non-aqueous organic solvent, an organic solid electrolyte, or an inorganic solid electrolyte may be used as the non-aqueous electrolytic solution. However, the present invention is not limited thereto.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. Depending on the circumstances, in order to impart incombustibility thereto, the non-aqueous electrolytic solution may further include halogen-containing solvents, such as carbon tetrachloride and ethylene trifluoride. Furthermore, in order to improve the high-temperature retention characteristics thereof, the non-aqueous electrolytic solution may further include carbon dioxide gas. Moreover, fluoro-ethylene carbonate (FEC) and propene sultone (PRS) may be further included.

BEST MODE

Now, exemplary embodiments of the present invention will be described in detail with reference to the accompanying drawings. It should be noted, however, that the illustrated embodiments are given for easier understanding of the present invention and thus the scope of the present invention is not limited by the illustrated embodiments.

Figure 1:
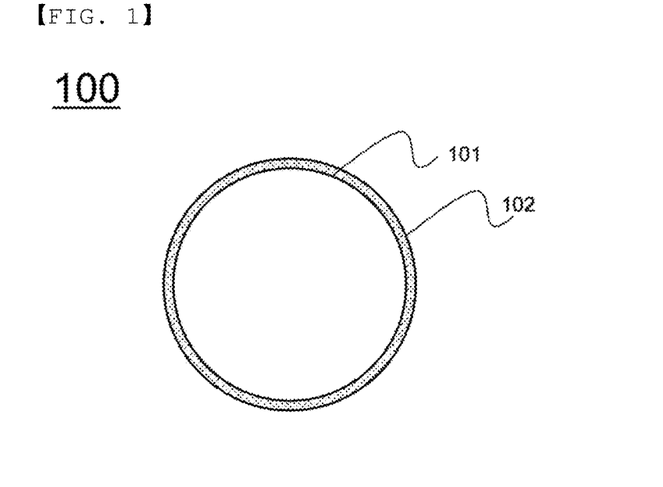
FIG. 1 is a sectional view schematically showing a composite for an electrode, the composite having a core-shell structure according to an embodiment of the present invention.
Figure 2:
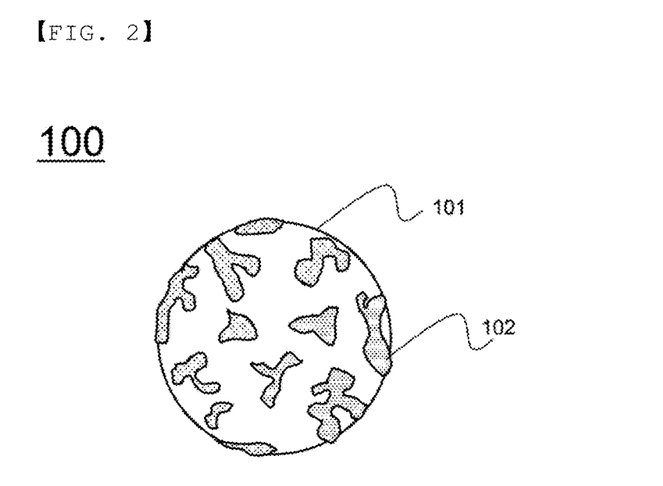
FIG. 2 is a perspective view of the composite having the core-shell structure shown in FIG. 1.

FIG. 1 is a sectional view schematically showing a composite for an electrode, the composite having a core-shell structure according to an embodiment of the present invention, and FIG. 2 is a perspective view schematically showing the composite of FIG. 1.

Referring to FIGS. 1 and 2, the composite, denoted by reference symbol 100, is configured to have a structure in which an electrode active material 101 is located in a core, which is the central part of the electrode, and in which a coating layer, made of a metal material 102, is formed on the surface of the electrode active material 101. The coating layer is not formed on the entire surface of the electrode active material 101 but is formed on at least a portion of the surface of the electrode active material 101. The coating layer is formed on 20% to 90% of the surface area of the electrode active material 101.

Although the coating layer is shown in FIGS. 1 and 2, the structure in which the same portion as the portion on which the coating layer is formed may be doped with a metal material is included.

FIGS. 3 to 6 are side views schematically showing electrode stacks constituted by various kinds of electrodes according to the present invention.

Figure 3:
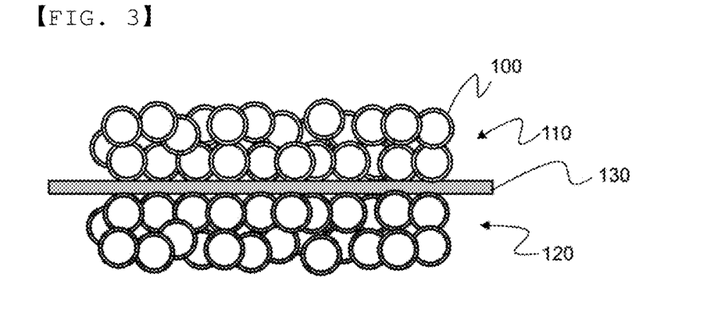
FIG. 3 is a side view showing an electrode assembly according to an embodiment of the present invention.
Figure 4:
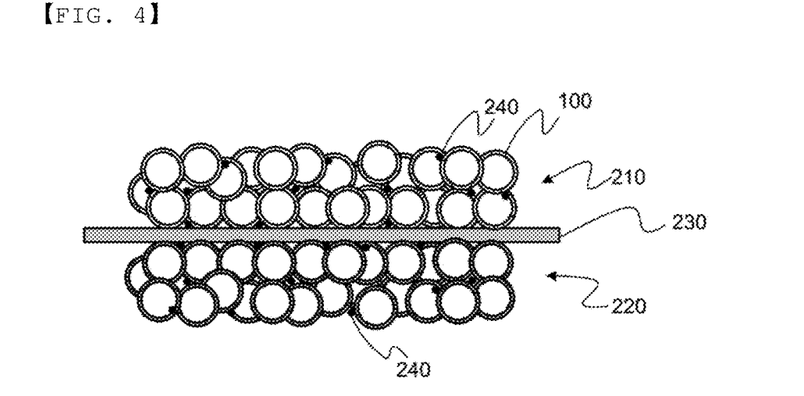
FIG. 4 is a side view showing an electrode assembly further including a conductive agent in addition to an electrode of FIG. 3.

Referring to FIGS. 3 and 4, a positive electrode mixture 110 including additives (not shown) is applied to the upper surface of a separator 130, and a negative electrode mixture 120 including additives (not shown) is applied to the lower surface of the separator 130.

Each of the positive electrode mixture 110 and the negative electrode mixture 120 may further include a conductive agent 240. In this case, it is possible to manufacture an electrode assembly configured to have a structure in which a positive electrode mixture 210 including a conductive agent 240 and a negative electrode mixture 220 including a conductive agent 240 are applied to the upper surface and the lower surface of a separator 230, respectively.

Figure 5:
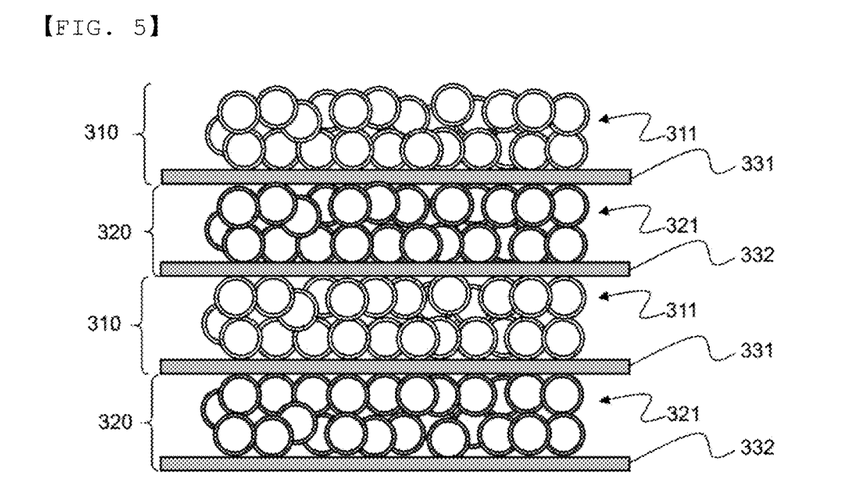
FIG. 5 is a side view showing an electrode assembly according to another embodiment of the present invention.

Referring to FIG. 5, positive electrode stacks 310, each of which is configured such that a positive electrode mixture layer 311 including composite for a positive electrode having a core-shell structure is formed on the upper surface of a corresponding separator 331, and negative electrode stacks 320, each of which is configured such that a negative electrode mixture layer 321 including a composite for a negative electrode having a core-shell structure is formed on the upper surface of a corresponding separator 332, are alternately stacked in order to constitute a stacked-type electrode assembly.

The structure in which the positive electrode mixture layer 311 of each of the positive electrode stacks 310 and the negative electrode mixture layer 321 of a corresponding one of the negative electrode stacks 320 are coupled to each other in a stacked state is similar to the structure of the electrode assembly shown in FIG. 3. However, the electrode assembly shown in FIG. 5 is different in structure from the electrode assembly shown in FIG. 3 as follows. The electrode assembly shown in FIG. 3 is configured to have a structure in which different mixture layers 110 and 120 are coated on opposite surfaces of the separator 130, whereas the positive electrode mixture layer 311 or the negative electrode mixture layer 321 is formed on only one surface of the separator 331 or the separator 332.

Figure 6:
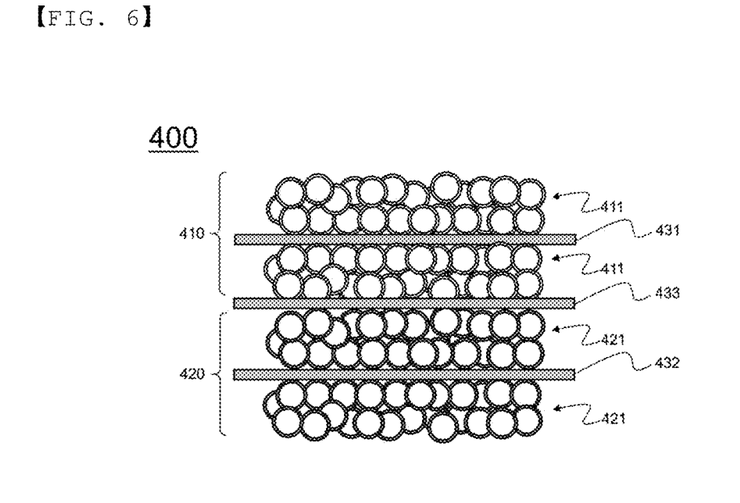
FIG. 6 is a side view showing an electrode assembly according to another embodiment of the present invention.

Referring to FIG. 6, an electrode assembly 400 is configured to have a structure in which a positive electrode stack 410, which is configured such that positive electrode mixture layers 411 each including a composite for a positive electrode having a core-shell structure are formed on opposite surfaces of a separator 431, and a negative electrode stack 420, which is configured such that negative electrode mixture layers 421 each including a composite for a negative electrode having a core-shell structure are formed on opposite surfaces of a separator 432, are disposed on the upper surface and the lower surface of a separator 433, respectively.

Figure 7:
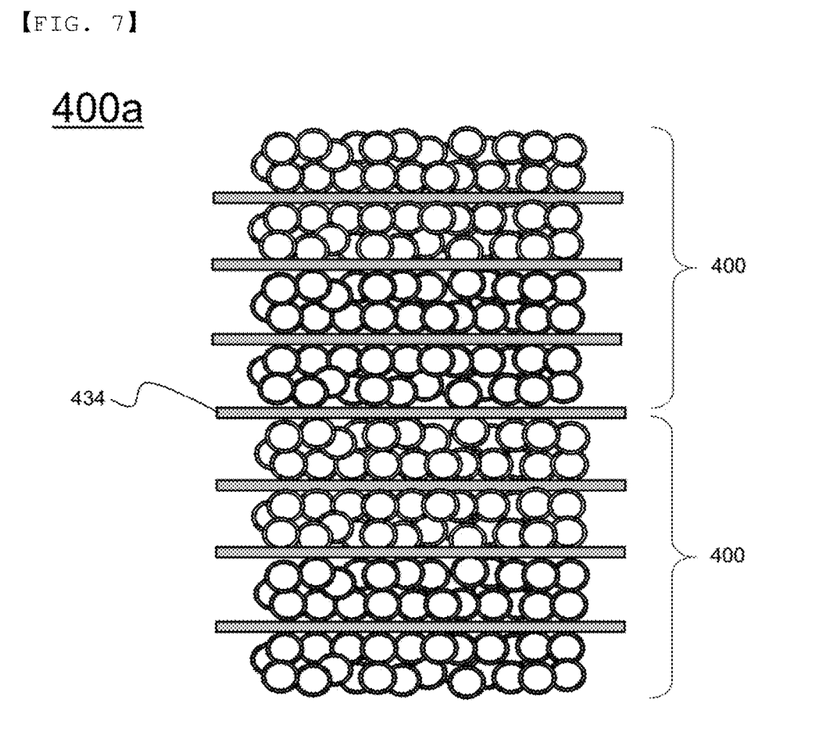
FIG. 7 is a side view showing the structure in which electrode assembly, one of which is shown in FIG. 6, are stacked up and down.

FIG. 7 is a side view schematically showing an electrode assembly configured to have a structure in which two electrode assemblies, one of which is shown in FIG. 6, are stacked.

Referring to FIG. 7, the electrode assembly, denoted by reference symbol 400a, is configured to have a structure in which electrode assembly units 400 are stacked up and down and in which a separator 434 is interposed between the electrode assembly units 400. Although FIG. 7 shows the structure in which two electrode assembly units 400 are stacked, three or more electrode assembly units 400 may be stacked, since the number of electrode assembly units may be selectively changed depending on the capacity of a secondary battery required by a device in which the secondary battery is used and the shape of the device.

Figure 8:
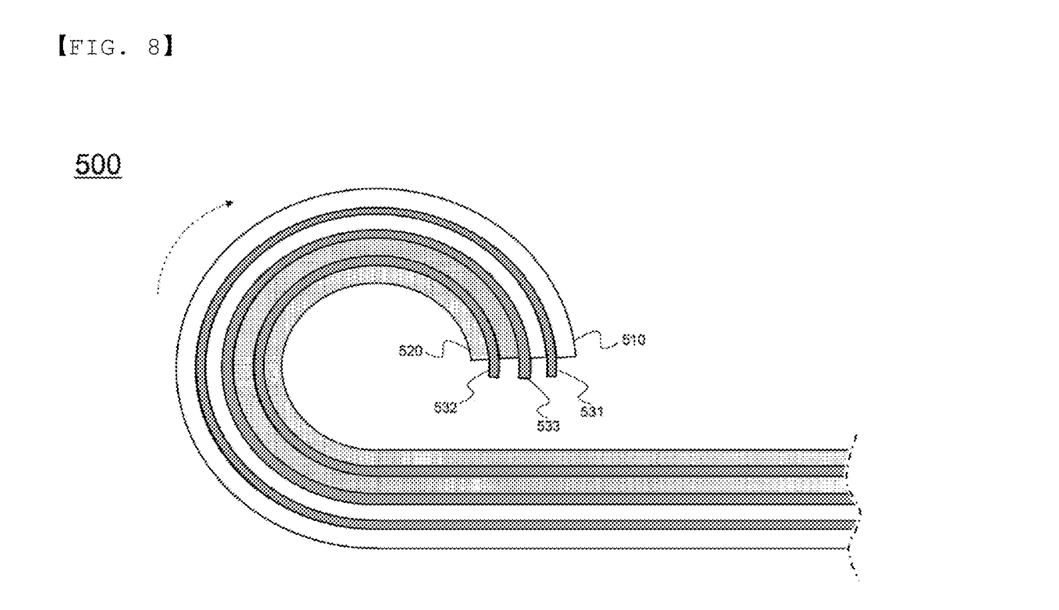
FIG. 8 is a side view showing a portion of an electrode assembly according to a further embodiment of the present invention.

FIG. 8 is a side view schematically showing a portion of an electrode assembly according to a further embodiment of the present invention.

Referring to FIG. 8, the electrode assembly, denoted by reference symbol 500, is similar in structure to the electrode assembly 400 shown in FIG. 6 in that a positive electrode stack, which is configured such that positive electrode mixture layers 510 are formed on opposite surfaces of a separator 531, and a negative electrode stack, which is configured such that negative electrode mixture layers 520 are formed on opposite surfaces of a separator 532, are stacked in the state in which a separator 533 is interposed between the positive electrode stack and the negative electrode stack. However, the electrode assembly 500 shown in FIG. 8 is different from the electrode assembly 400 shown in FIG. 6 in that the electrode assembly 500 is a jelly-roll-type electrode assembly, which is configured to have a structure in which long sheet-type electrode mixture layers are wound in the state in which the separator is interposed between the long sheet-type electrode mixture layers in the direction indicated by the arrow.

In addition, each of the electrode assemblies shown in FIGS. 5 to 8 may further include a conductive agent, and an electrode assembly, configured to have a structure in which an electrode mixture layer is formed directly on a separator without using a separate electrode current collector, as described above, may be used, whereby it is possible to provide a secondary battery having increased capacity and energy density.

Hereinafter, the present invention will be described with reference to embodiments of the present invention. It should be noted, however, that the illustrated embodiments are given for easier understanding of the present invention, and thus the scope of the present invention is not limited by the illustrated embodiments.

Embodiment 1

Manufacture of Positive Electrode 96.25 weight % of $LiNi_{0.6}Co_{0.2}Mn_{0.2}O_2$ as a positive electrode active material, 1.5 weight % of denka black as a conductive material, and 2.25 weight % of PVDF as a binder were added to a solvent and mixed in order to manufacture a positive electrode mixture.

The positive electrode mixture was coated on an aluminum foil having a thickness of 30 μm by a loading amount of 5 mAh/cm² and then dried in order to manufacture a positive electrode.

Manufacture of Negative Electrode

Natural graphite was added to a solution containing hydrochloric acid and activated by stirring at room temperature for 30 minutes. The natural graphite was then washed with distilled water and dried in an oven at 60° C. under vacuum. The dried natural graphite was dispersed and stirred for about 10 minutes in a solution containing $CuSO_4$ and maintained at a pH of 12-13 adding sodium hydroxide (NaOH). Thereafter, natural graphite was washed in distilled water and dried in an oven at 100° C. under vacuum to manufacture negative electrode having a core-shell structure coated with Cu.

95.4 weight % of the natural graphite coated with Cu manufactured above, 1.0 weight % of SuperC65 as a conductive material, and 2.5 weight % of Styrene butadiene rubber (SBR) and 1.1 weight % of Carboxymethylcellulose (CMC) as a binder were added to a solvent and mixed in order to manufacture a negative electrode mixture.

A separator was prepared to have a separator substrate made of a polypropylene and a coating layer having a thickness of 5 μm coated on opposite surfaces of the separator substrate. The separator was fixed on PET film.

The negative electrode mixture was coated on the separator by a loading amount of 5.4 mAh/cm2 using a doctor blade and then dried in oven at 60° C. and the PET film was removed to manufacture an negative electrode coated with the negative electrode mixture on the separator.

An electrode assembly was manufactured by stacking and rolling the separator coated with the negative electrode mixture and the positive electrode.

Embodiment 2

An electrode assembly was manufactured in the same process as in Embodiment 1 except that a positive electrode mixture including a composite having a core-shell structure, in which aluminum (Al) was coated on the surface of a positive electrode active material, made of a lithium cobalt oxide, was manufactured and that the positive electrode mixture was coated on the other surface of a separator.

Manufacture of Positive Electrode (Manufacture of a Composite Having a Core-Shell Structure Coated with Aluminum on NCM Surface)

$LiNi_{0.6}Co_{0.2}Mn_{0.2}O_2$ as a positive electrode active material was added to an $Al(NO_3)_3.9H_2O$ aqueous solution and stirred at room temperature at 40 rpm for about 6 hours to prepare a mixture.

Thereafter, the mixture was stirred while raising the temperature to 80° C. to have water in the aqueous solution evaporated.

Then, the mixture was dried for about 4 hours in a vacuum atmosphere.

The dried mixture was heat-treated at 800° C. for 8 hours to manufacture a positive electrode having a core-shell structure coated with Al.

90 weight % of the positive electrode manufactured above, 5 weight % of denka black as a conductive material, and 5 weight % of polyvinylidene fluoride (PVdF) as a binder were added to N-methyl-2-pyrollidinone (NMP) as a solvent and mixed in order to manufacture a positive electrode mixture.

The positive electrode mixture was coated on opposite surfaces of the separator coated with the negative electrode mixture prepared in Embodiment 1 in order to manufacture an electrode assembly.

Comparative Example 1

A positive electrode mixture including a positive electrode active material, made of a lithium cobalt oxide, and a negative electrode mixture including a negative electrode active material, made of natural graphite, was manufactured.

95.4 weight % of natural graphite, 1.0 weight % of SuperC65 as a conductive material, and 2.5 weight % of SBR and 1.1 weight % of CMC as a binder were added to a solvent and mixed in order to manufacture a negative electrode mixture.

The positive electrode manufactured in Embodiment 1 and the negative electrode mixture were coated on opposite surfaces of the separator prepared in Embodiment 1 and then dried and rolled in order to manufacture an electrode assembly.

The positive electrode mixture and the negative electrode mixture were coated on opposite surfaces of a separator and then dried and rolled in order to manufacture an electrode assembly.

Comparative Example 2

A positive electrode mixture including a positive electrode active material, made of a lithium cobalt oxide, was coated on one surface of aluminum foil in order to manufacture a positive electrode, and a negative electrode mixture including a negative electrode active material, made of natural graphite, was coated on one surface of copper (Cu) foil in order to manufacture a negative electrode.

The negative electrode mixture manufactured in Comparative Example 1 was coated on copper foil having a thickness of 15 μm by a loading amount of 5.4 mAh/cm² in order to manufacture a negative electrode.

The positive electrode manufactured in Embodiment 1 and the negative electrode were disposed on opposite surfaces of the separator prepared in Embodiment 1 and then rolled in order to manufacture an electrode assembly.

The positive electrode and the negative electrode were placed on opposite surfaces of a separator and then rolled in order to manufacture an electrode assembly.

The electrodes manufactured according to Embodiments 1 and 2 and Comparative Examples 1 and 2 are configured as follows.

|  | Negative electrode current collector | Negative electrode having core-shell structure | Positive electrode current collector | Positive electrode having core-shell structure |
| --- | --- | --- | --- | --- |
| Embodiment 1 | X | ○ | ○ | X |
| Embodiment 2 | X | ○ | X | ○ |
| Comparative Example 1 | X | X | X | X |
| Comparative Example 2 | ○ | X | ○ | X |

Experimental Example 1

Coin cells including the electrode assemblies manufactured according to Embodiment 1, Embodiment 2, and Comparative Example 2 were manufactured, and then the energy densities of the coin cells were measured. The measured energy densities of the coin cells are shown in FIG. 9.

Figure 9:
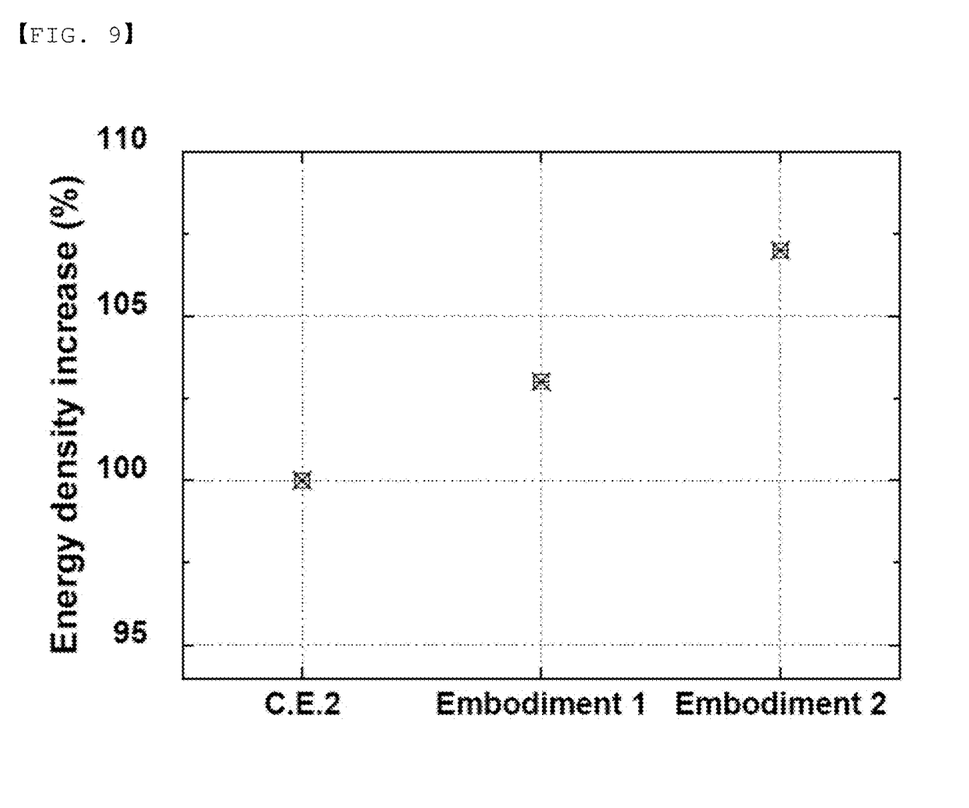
FIG. 9 is a graph showing energy densities according to Experimental Example 1.

Referring to FIG. 9, on the assumption that the energy density of the coil cell manufactured according to Comparative Example 2 (C.E. 2) was 100%, the energy density of the coil cell manufactured according to Embodiment 1 was 103%, and the energy density of the coil cell manufactured according to Embodiment 2 was 107%. That is, it can be seen that, in the case in which a negative electrode having no current collector and having a core-shell structure, in which metal is coated on the surface of a negative electrode active material, is used, as in Embodiment 1, the energy density of the negative electrode is increased 3% and that, in the case in which an electrode having a core-shell structure, in which metal is coated on the surface of an electrode active material, is used as both of a positive electrode and a negative electrode, as in Embodiment 2, the energy density of the negative electrode is increased 7%.

Experimental Example 2

The cycle characteristics of coin cells manufactured using the electrode assemblies manufactured according to Embodiment 1 and Comparative Example 1 were measured. The measurement results are shown in FIG. 10.

Figure 10:
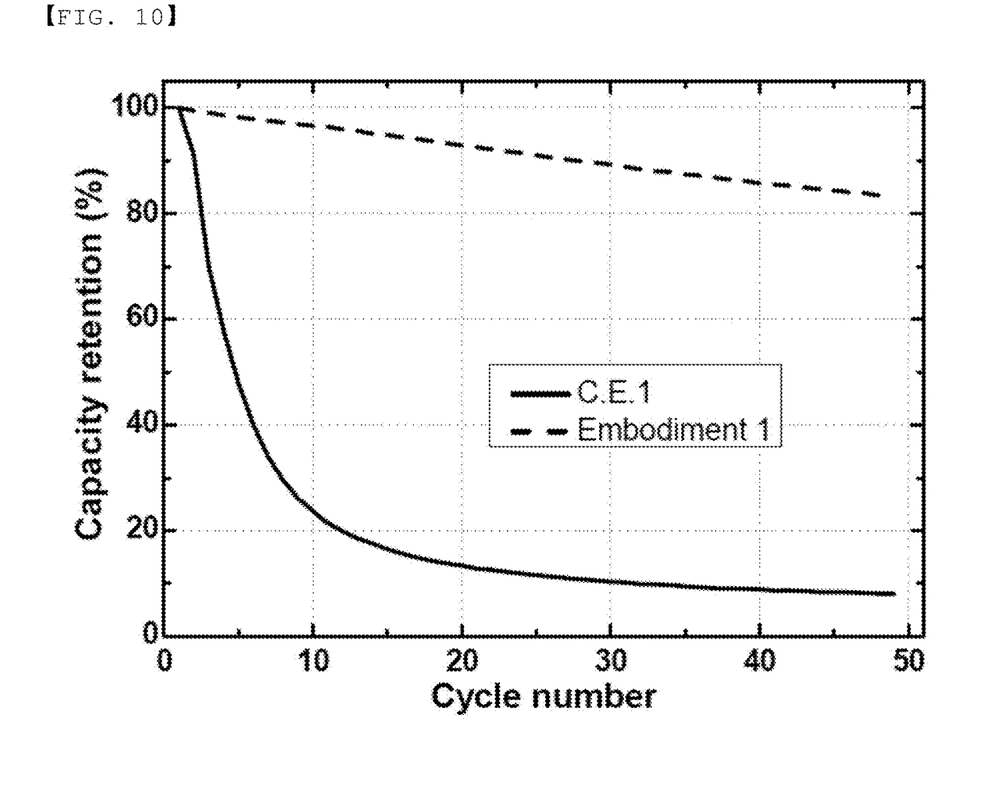
FIG. 10 is a graph showing cycle characteristics according to Experimental Example 2.

Referring to FIG. 10, in the case of Comparative Example 1 (C.E. 1), no current collector was provided and the conductivity of the active material was very low, with the result that charging/discharging was not satisfactorily performed, and therefore the capacity of the coin cell was abruptly reduced. In the case of Embodiment 1, the efficiency of charging/discharging of the coin cell was increased, since no current collector was provided at the negative electrode but Cu was coated on the negative electrode active material. In addition, it can be seen that the coin cell had a capacity of 80% or more even after 50 cycles. Consequently, it can be seen that the coin cell according to the present invention exhibits considerably high cycle characteristics.

In the case in which an electrode having no electrode current collector and having a composite having a core-shell structure, in which metal is coated on the surface of an electrode active material, is used, as described above, not only the energy density of a coin cell is increased but also the cycle characteristics of the coil cell are improved.

Those skilled in the art to which the present invention pertains will appreciate that various applications and modifications are possible based on the above description, without departing from the scope of the present invention.

INDUSTRIAL APPLICABILITY

As is apparent from the above description, the electrode according to the present invention is an electrode for batteries that does not include a metal-film-type current collector and that is configured to have a core-shell structure including an electrode active material and a metal material coated on or doped in the surface of the electrode active material. Consequently, the amount of the electrode that is loaded is increased in proportion to the volume of an electrode current collector used in a conventional electrode, whereby it is possible to increase the capacity and the energy density of a battery.

In addition, the electrode according to the present invention is configured such that a metal material, which exhibits excellent oxidation or reduction and exhibits high electrical conductivity, is coated on or doped in the surface of an electrode active material, even though no electrode current collector is used. Consequently, it is possible to provide an electrode that exhibits high electrical conductivity, whereby it is possible to provide a secondary battery having improved rate characteristics and lifespan characteristics.

The invention claimed is:

1. An electrode for batteries, comprising:
   composite particles having a core-shell structure comprising a core having an electrode active material, and a shell disposed on the surface of the core, wherein the shell is a metal layer and wherein the metal of the metal layer is at least one selected from a group consisting of aluminum (Al), copper (Cu), and nickel (Ni); and
   a binder,
   wherein the binder is a polymer binder and disposed between composite particles,
   wherein the electrode does not include a current collector.

2. The electrode according to claim 1, wherein the electrode is at least one of a positive electrode or a negative electrode.

3. The electrode according to claim 2, wherein the positive electrode comprises at least one positive electrode active material represented by chemical formulas 1 to 3.

$$Li_aCo_{1-x}M_xO_2 \qquad (1)$$

$$Li_aMn_{2-y}M_yO_4 \qquad (2)$$

$$Li_aFe_{1-z}M_zPO_4 \qquad (3)$$

wherein 0.8≤a≤1.2; 0≤x≤0.8; 0≤y≤0.6; 0≤z≤0.5, and
M is at least one selected from a group consisting of Ti, Cd, Cu, Cr, Mo, Mg, Al, Ni, Nb, V, and Zr.

4. The electrode according to claim 2, wherein the negative electrode comprises a carbon-based negative electrode active material or a silicon-based negative electrode active material.

5. The electrode according to claim 1, wherein 20% to 90% of the surface of the core is coated or doped with the metal material.

6. The electrode according to claim 1, wherein the electrode further comprises a conductive agent.

7. The electrode according to claim 6, wherein the conductive agent is at least one selected from a group consisting of natural graphite, artificial graphite, carbon black, acetylene black, Ketjen black, channel black, and conductive fiber.

8. A secondary battery, comprising:
a separator; and
the electrode according to claim 1 coated on a first surface of the separator.

9. The secondary battery according to claim 8, wherein the electrode is a negative electrode, and further comprising:
a positive electrode coated on a second surface of the separator, wherein the second surface is opposite of the first surface of the separator, and wherein the positive electrode comprises:
composite particles having a core-shell structure comprising a core having a positive electrode active material, and a metal material coated on or doped in a surface of the core,
wherein the positive electrode does not include a current collector.

10. The secondary battery according to claim 8, wherein the electrode is a negative electrode, and further comprising:
a second separator having a positive electrode coated on a first surface of the second separator, and wherein the positive electrode comprises:
composite particles having a core-shell structure comprising a core having a positive electrode active material, and a metal material coated on or doped in a surface of the core,
wherein the positive electrode does not include a current collector,
wherein the separator having the negative electrode coated thereon, and the second separator having the positive electrode coated thereon are stacked such that the first surface of the separator and the first surface of the second separator face the same direction.

11. The secondary battery according to claim 8, wherein the electrode is a negative electrode and the separator is a first separator, and further comprising:
a second negative electrode coated on a second surface of the first separator, wherein the second surface of the first separator is opposite the first surface of the first separator, and wherein the composition of the second negative electrode is the same that of the negative electrode;
a second separator having two positive electrode coated thereon, wherein one positive electrode is coated on a first surface of the second separator, and wherein the other positive electrode is coated on a second surface of the second separator, wherein the second surface of the second separator is opposite the first surface of the second separator, and wherein each positive electrode comprises composite particles having a core-shell structure comprising a core having an positive electrode active material, and a metal material coated on or doped in a surface of the core, and wherein each positive electrode does not include a current collector; and
a third separator, wherein the first separator, second separator, and third separator are stacked such that the third separator is interposed between a negative electrode of the first separator and a positive electrode of the second separator.

12. The secondary battery according to claim 8, wherein the electrode is a negative electrode and the separator is a first separator, and further comprising:
a second negative electrode coated on a second surface of the first separator, wherein the second surface of the first separator is opposite the first surface of the first separator, and wherein the composition of the second negative electrode is the same that of the negative electrode;
a second separator having two positive electrode coated thereon, wherein one positive electrode is coated on a first surface of the second separator, and wherein the other positive electrode is coated on a second surface of the second separator, wherein the second surface of the second separator is opposite the first surface of the second separator, and wherein each positive electrode comprises composite particles having a core-shell structure comprising a core having an positive electrode active material, and a metal material coated on or doped in a surface of the core, and wherein each positive electrode does not include a current collector; and
a third separator, wherein the first separator, second separator, and third separator are wound such that the third separator is interposed between a negative electrode of the first separator and a positive electrode of the second separator.

13. A battery pack comprising a secondary battery according to claim 8.

14. The secondary battery of claim 8, wherein the electrode is a negative electrode, and further comprising:
a positive electrode having a positive electrode active material disposed on a current collector, wherein the positive electrode active material faces a second surface of the separator, wherein the second surface of the separator is opposite the first surface of the separator.

15. The electrode according to claim 7, wherein the conductive fiber is selected from the group consisting of carbon fiber and metallic fiber.

16. The electrode according to claim 8, wherein the conductive agent is disposed between composite particles.

* * * * *